United States Patent
Hirakata

(10) Patent No.: US 8,247,123 B2
(45) Date of Patent: Aug. 21, 2012

(54) ELECTRIC POWER SOURCE CONTROL APPARATUS, ELECTRIC POWER SOURCE CONTROL METHOD, AND VEHICLE INCLUDING ELECTRIC POWER SOURCE CONTROL APPARATUS

(75) Inventor: Syuuji Hirakata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 888 days.

(21) Appl. No.: 11/663,430

(22) PCT Filed: Oct. 13, 2005

(86) PCT No.: PCT/IB2005/003047
§ 371 (c)(1),
(2), (4) Date: Mar. 21, 2007

(87) PCT Pub. No.: WO2006/040657
PCT Pub. Date: Apr. 20, 2006

(65) Prior Publication Data
US 2008/0032162 A1 Feb. 7, 2008

(30) Foreign Application Priority Data
Oct. 15, 2004 (JP) ................................. 2004-300950

(51) Int. Cl.
*H01M 8/04* (2006.01)
(52) U.S. Cl. ......... 429/430; 429/428; 429/431; 429/432
(58) Field of Classification Search .................. None
See application file for complete search history.

(56) References Cited

U.S. PATENT DOCUMENTS

| | | | |
|---|---|---|---|
| 4,107,776 A * | 8/1978 | Beale | 701/99 |
| 4,988,283 A | 1/1991 | Nagasawa et al. | |
| 6,428,917 B1 * | 8/2002 | Lacy et al. | 429/13 |
| 2003/0008188 A1 * | 1/2003 | Aoyagi et al. | 429/23 |
| 2003/0217559 A1 | 11/2003 | Ieda et al. | |
| 2005/0014039 A1 | 1/2005 | Rolf | |

FOREIGN PATENT DOCUMENTS

DE 101 06 219 A1 8/2002

(Continued)

OTHER PUBLICATIONS

Jul. 20, 2010 Office Action issued in JP Application No. 2004-300950 (with English translation).

*Primary Examiner* — Melvin C Mayes
*Assistant Examiner* — Colin W Slifka
(74) *Attorney, Agent, or Firm* — Oliff & Berridge, PLC

(57) ABSTRACT

An electric power source control apparatus (50) includes a required electric power decision portion that receives an operation input signal from an outside of an electric power source (20), and decides an amount of electric power required of the electric power source (20), in accordance with the operation input signal; and an electric power source operation portion that operates the electric power source (20) in accordance with the amount of the required electric power. The electric power source operation portion limits an amount of electric power used for heating when the amount of the required electric power is larger than an amount of electric power that can be supplied by the electric power source, during heating.

19 Claims, 12 Drawing Sheets

FOREIGN PATENT DOCUMENTS

| | | |
|---|---|---|
| JP | A-61-233975 | 10/1986 |
| JP | A 2000-294263 | 10/2000 |
| JP | A 2000-315511 | 11/2000 |
| JP | A 2002-313391 | 10/2002 |
| JP | A-2003-168464 | 6/2003 |
| JP | A 2003-249251 | 9/2003 |
| JP | A 2004-055379 | 2/2004 |
| JP | A-2004-281219 | 10/2004 |

* cited by examiner

IN CASE WHERE REQUIRED DRIVING ELECTRIC POWER AMOUNT IS LARGER THAN FC ELECTRIC POWER AMOUNT

IN CASE WHERE REQUIRED DRIVING ELECTRIC POWER AMOUNT IS SMALLER THAN FC ELECTRIC POWER AMOUNT

RELATION BETWEEN FC VOLTAGE AND FC CURRENT

ELECTRIC POWER SUPPLIED BY FC SYSTEM AND ELECTRIC POWER SUPPLIED BY SECONDARY ELECTRIC POWER SOURCE

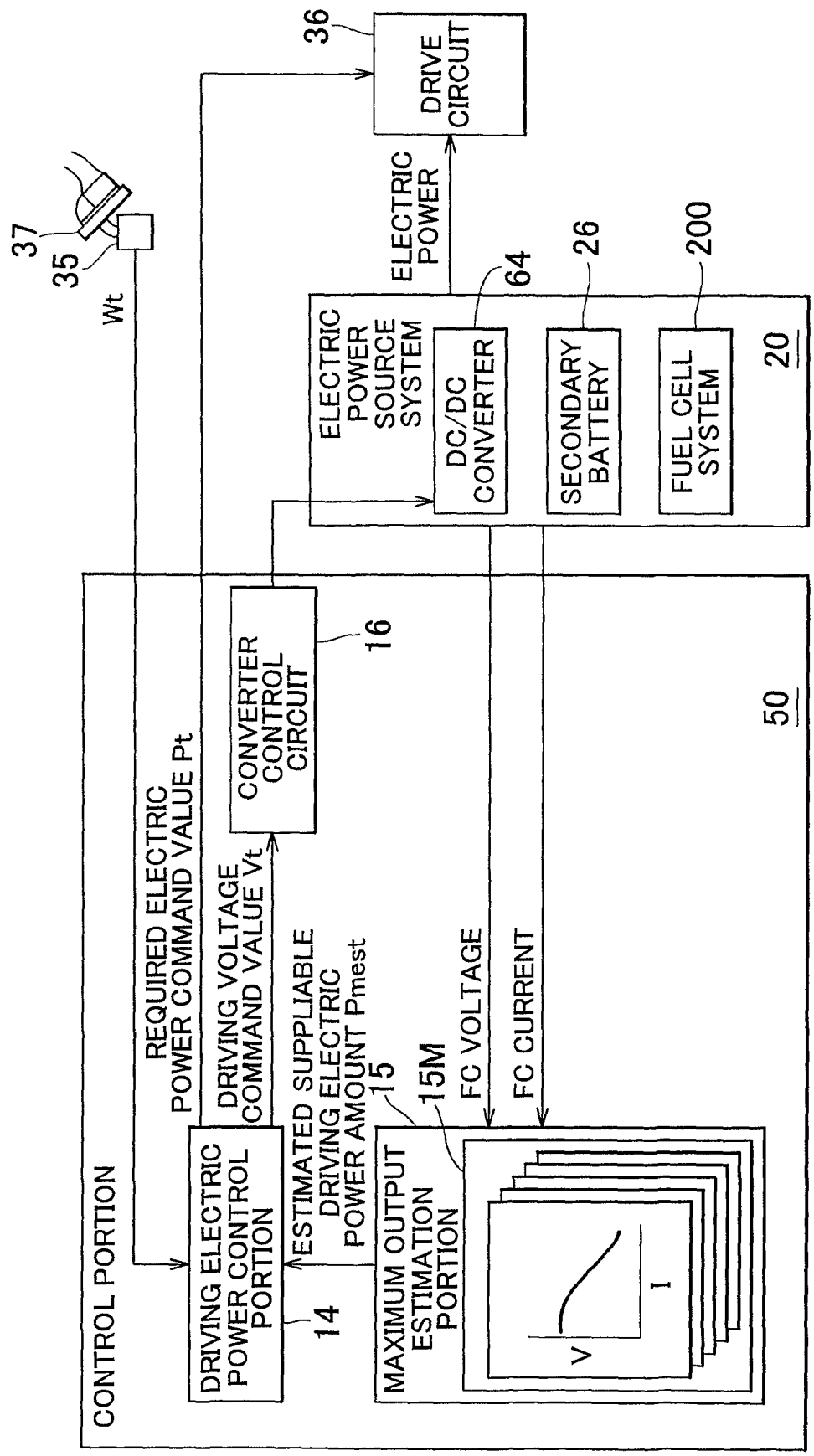

ELECTRIC POWER SOURCE CONTROL APPARATUS, ELECTRIC POWER SOURCE CONTROL METHOD, AND VEHICLE INCLUDING ELECTRIC POWER SOURCE CONTROL APPARATUS

FIELD OF THE INVENTION

The invention relates to a control of an electric power source including a fuel cell.

BACKGROUND OF THE INVENTION

A technology has been proposed for controlling a vehicle including a fuel cell system while the fuel cell system is being started and rated operation cannot be performed. For example, Japanese Patent Application Publication No. JP 2003-249251 A, Japanese Patent Application Publication No. JP 2004-55379 A, Japanese Patent Application Publication No. JP 2002-313391 A disclose technologies in each of which when a temperature of a fuel cell is low, the fuel cell is heated by a heater so as to be smoothly started. Japanese Patent Application Publication No. JP 2000-315511 A discloses a technology in which when a driver depresses an accelerator pedal to a large extent, supply of electric power to a fuel reforming system is limited, and the electric power is used for driving a vehicle.

However, no consideration has been given to improvement of driveability which requires a driving system of a vehicle to respond as intended by a driver. For example, in the technology disclosed in the Japanese Patent Application Publication No. 2000-315511 A, an amount of electric power that can be used in a driving system of the vehicle can be increased. However, since the amount of the electric power that can be used in the driving system is not increased in quick response, the increase in the amount of the electric power that can be used in the driving system does not contribute to improvement of the drivability. On the contrary, the drivability may be decreased by the increase in the amount of the electric power that can be used in the driving system. Since the electric power is not increased in quick response, an output of the driving system may be increased after a certain delay, and accordingly unexpected acceleration may occur. Further, not only vehicles including a fuel cell system, but also a wide range of electric power sources including a fuel cell system have this problem concerning operability.

DISCLOSURE OF THE INVENTION

It is an object of the invention to provide a technology in which when an electric power source including a fuel cell is controlled, a decrease in operability of the electric power source due to a decrease in an output of the electric power source is suppressed.

An aspect of the invention relates to an electric power source control apparatus which controls an electric power source including a fuel cell. The electric power source includes a heating portion. The electric power source control apparatus includes a required electric power decision portion that receives an operation input signal from an outside of the electric power source, and decides an amount of electric power required of the electric power source, in accordance with the operation input signal; and an electric power source operation portion that operates the electric power source in accordance with the amount of the required electric power. The heating portion may heat a fuel cell system including the fuel cell by using electric power generated by the electric power source. The heating portion may heat the fuel cell. The electric power source operation portion limits an amount of electric power used for heating when the amount of the required electric power is larger than an amount of electric power that can be supplied by the electric power source, during heating.

In this control apparatus, the amount of electric power used for heating the fuel cell is limited when the amount of the required electric power is larger than the amount of the electric power that can be supplied by the electric power source. Therefore, operatiblity of the electric power source is improved by increasing the amount of the electric power that can be supplied by the electric power source.

Particularly, when heating the fuel cell, the output of the fuel cell frequently becomes small, and therefore the amount of the required electric power frequently exceeds the amount of the electric power that can be supplied by the electric power source. Accordingly, a noticeable effect can be obtained by stopping heating of the fuel cell. Further, the amount of the electric power used for heating can be reduced with little time delay by stopping heating of the fuel cell. Therefore, stop of heating greatly contributes to improvement of operability of the electric power source. That is, it is possible to increase the output of the electric power source as intended by the driver, by stopping heating of the fuel cell.

The amount of the electric power that can be supplied by the electric power source, which is compared with the amount of the required electric power, may be estimated by a method described later. Also, for example, during a starting sequence of the fuel cell system, a simple estimation method may be employed, in which the amount of the electric power that can be supplied by the electric power source is constantly estimated to be 50% of a rated output.

The electric power source operation portion may increase an extent to which the amount of the electric power used for heating is limited, as a difference between the amount of the electric power that can be supplied by the electric power source and the amount of the required electric power increases. With this configuration, it is possible to prevent heating of the fuel cell from being excessively limited. The heating portion may heat the fuel cell by using plural heaters. The electric power source operation portion may adjust the extent to which the amount of the electric power used for heating is limited, by changing the number of heaters to which electric power is supplied, among the plural heaters.

In general, an inductance component of the heater is small. Therefore, it is possible to increase the amount of the electric power that can be supplied by the electric power source with little time delay, by turning the heater off using a switch. Thus, since the amount of the electric power that can be supplied by the electric power source is increased in quick response, the operability of the electric power source is greatly improved.

A connection between at least two of the plural heaters can be changed between a parallel connection and a series connection. The electric power source operation portion may adjust the extent to which the amount of the electric power used for heating is limited, by changing the number of heaters to which electric power is supplied through the series connection.

Since the heater generates heat using resistance, when the connection between at least two of the plural heaters is changed from a parallel connection to a series connection, the amount of the electric power supplied to the heater is reduced due to a decrease in an electric current value. Further, the connection between the heaters can be changed with little time delay by operating a switch. Thus, since the connection between the heaters can be changed in quick response, the operability of the electric power source is greatly improved.

Thus, the heater can increase with little time delay the amount of the electric power that can be supplied by the electric power source, by operating a switch and/or by changing the connection between the heaters. Examples of the heater includes a sheath heater, a glove plug heater, and a PTC heater.

Further, the electric power source control apparatus may include an estimation portion that estimates the amount of the electric power that can be supplied by the electric power source, and the electric power source operation portion may limit the amount of the electric power used for heating, based on the estimated amount of the electric power.

The estimation portion may measure a current-voltage characteristic of the fuel cell, and may estimate the amount of the electric power that can be supplied by the electric power source, based on the measured current-voltage characteristic. Also, the estimation portion may measure a temperature of the fuel cell, and may estimate the amount of the electric power that can be supplied by the electric power source, based on the measured temperature.

The invention can be applied to an electric power control method, a control method for a fuel cell system, and apparatuses such as a vehicle including the electric power source control apparatus. Thus, the invention can be realized in various embodiments.

BRIEF DESCRIPTION OF THE DRAWINGS

The foregoing and further objects, features and advantages of the invention will become apparent from the following description of exemplary embodiments with reference to the accompanying drawings, wherein like numerals are used to represent like elements and wherein:

FIG. 4 is a control block diagram showing a control of the vehicle according to the embodiment of the invention;

DETAILED DESCRIPTION OF THE EXEMPLARY EMBODIMENTS

Hereinafter, an embodiment of the invention will be described in an order described below.

A. Configuration of a vehicle according to the embodiment of the invention

B. Control of the vehicle according to the embodiment of the invention

C. Modified example

A. Configuration of a Vehicle According to the Embodiment of the Invention

Figure 1:
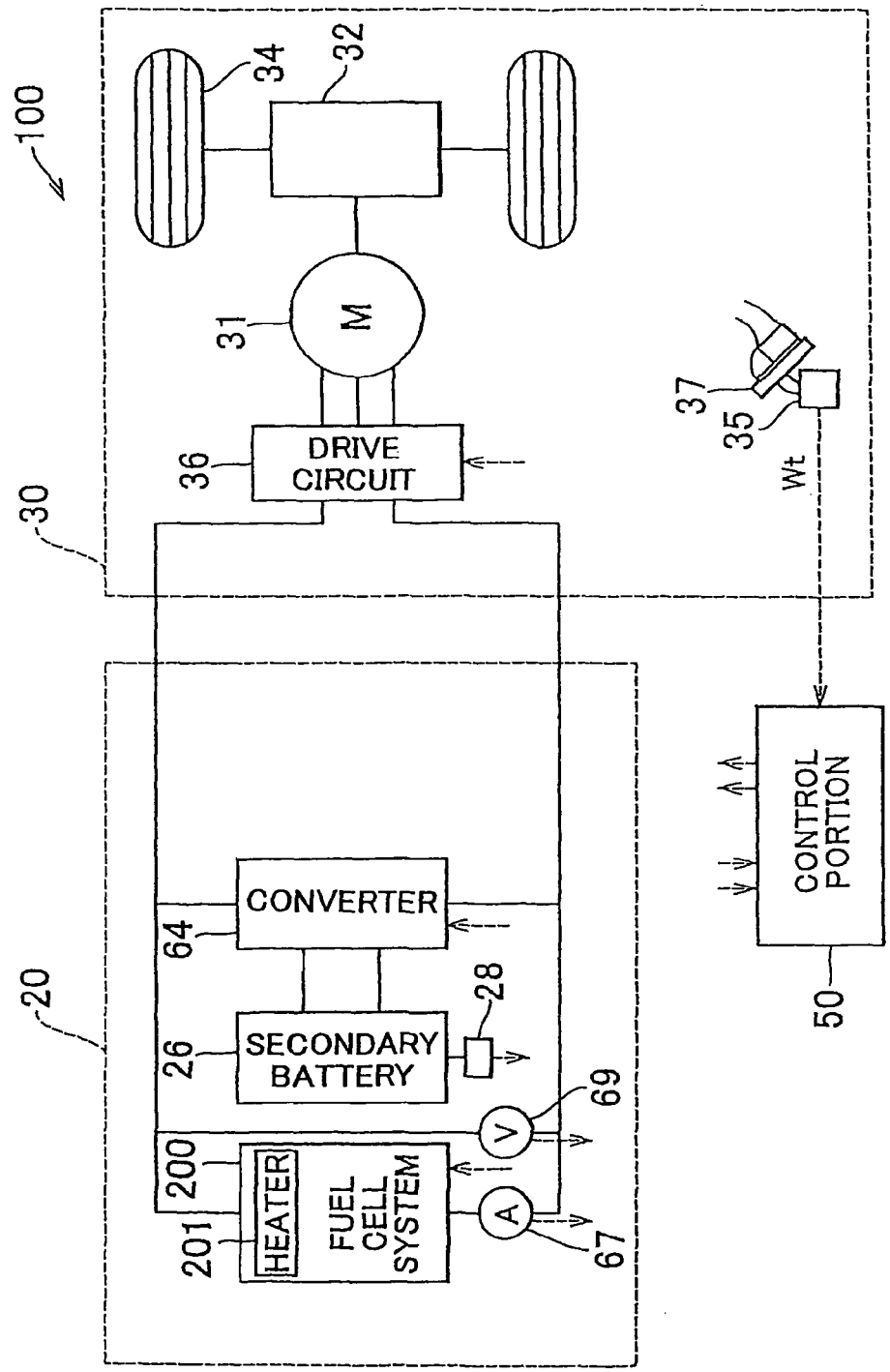
FIG. 1 is a schematic diagram showing a configuration of a vehicle including a fuel cell system according to an embodiment of the invention.

FIG. 1 is a schematic diagram showing a configuration of a vehicle including a fuel cell system according to the embodiment of the invention. A vehicle 100 includes an electric power source system 20, a load portion 30, and a control portion 50. The electric power source system 20 supplies the load portion 30 with electric power that is power for the vehicle 100. The load portion 30 converts the supplied electric power to mechanical power for driving the vehicle 100. The control portion 50 controls the electric power source system 20 and the load portion 30.

The electric power source system 20 includes a fuel cell system 200, a secondary battery 26, a DC/DC converter 64, a voltmeter 69 that measures an output voltage of the fuel cell system 200, an ammeter 67 that measures an output electric current of the fuel cell system 200, and a remaining capacity monitor 28 that measures a remaining amount of the secondary battery 26. The fuel cell system 200 includes a heater 201 that heats a fuel cell (not shown) and another portion of the fuel cell system 200.

The load portion 30 includes an accelerator pedal 37, an accelerator sensor 35 that measures a depression amount of the accelerator pedal 37 (also referred to as "accelerator pedal operation amount"), a drive circuit 36, a motor 31, a gear mechanism 32, and wheels 34. The drive circuit 36 drives the motor 31. For example, the drive circuit 36 includes a transistor inverter. Power generated by the motor 31 is transmitted to the wheels 34 via the gear mechanism 32.

The drive circuit 36 converts direct current electric power supplied from the electric power source system 20 to three-phase alternating current electric power, and supplies the three-phase alternating current electric power to the motor 31. A magnitude of the supplied three-phase alternating current electric power is decided by the drive circuit 36 that is controlled by the control portion 50 in accordance with an input from the accelerator sensor 35 (an accelerator pedal operation amount Wt). Thus, a vehicle system is configured such that the magnitude of the three-phase alternating current electric power supplied to the motor 31 does not depend on the output voltage of the electric power source system 20.

The control portion 50 is electrically connected to the fuel cell system 200, the DC/DC converter 64, and the drive circuit 36. The control portion 50 controls various controls including controls of the components. The control portion 50 performs operation of the various controls by executing a computer program stored in memory (not shown) provided inside the control portion 50. As the memory, various recording media such as ROM and a hard disc can be used.

Figure 2A:
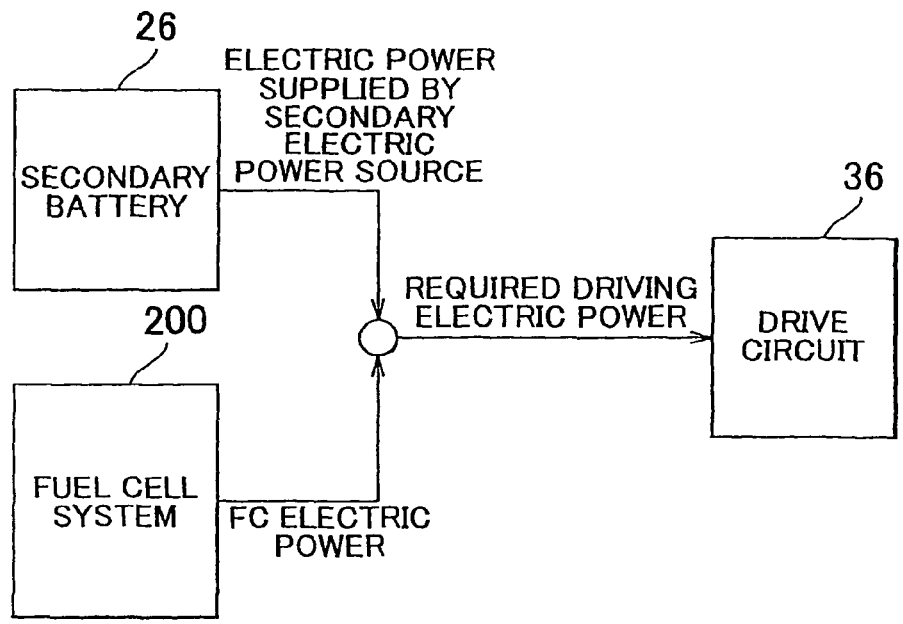
FIGS. 2A and 2B are block diagrams each showing a situation in which a secondary battery 26 and a fuel cell system 200 supply electric power to a drive circuit 36.
Figure 2B:
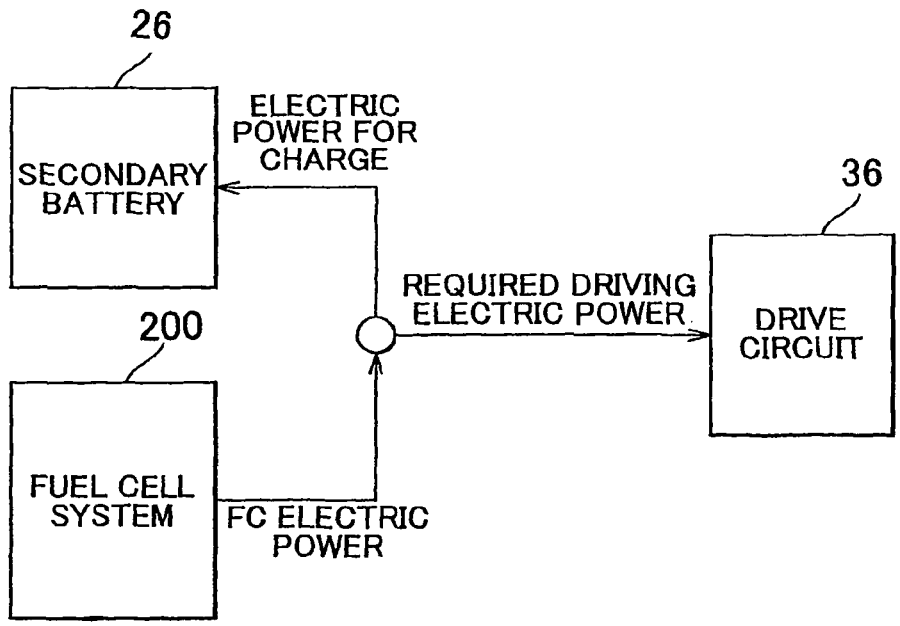

FIG. 2A and FIG. 2B are block diagrams each showing a situation in which the secondary battery 26 and the fuel cell system 200 supply electric power to the drive circuit 36. FIG. 2A shows a case where a driving electric power amount required by the drive circuit 36 is larger than an FC electric power amount that is an amount of electric power output from the fuel cell system 200. FIG. 2B shows a case where the driving electric power amount required by the drive circuit 36 is smaller than the FC electric power amount.

In the case where the driving electric power amount required by the drive circuit 36 is larger than the FC electric power amount, the fuel cell system 200 and the secondary battery 26 simultaneously supply electric power to the drive circuit 36 (refer to FIG. 2A). For example, when the accelerator pedal 37 is depressed and the required driving electric power is instantaneously increased, both of the secondary battery 26 and the fuel cell system 200 supply electric power to the drive circuit 36.

In the case where the driving electric power amount required by the drive circuit 36 is smaller than the FC electric power amount, an excess amount of electric power in the FC electric power amount is supplied to the secondary battery 26, and the secondary battery 26 is charged with the excess amount of electric power as described later (refer to FIG. 2B). For example, when the required driving electric power amount is decreased during idling, the fuel cell system 200 supplies electric power to both of the drive circuit 36 and the secondary battery 26.

Figure 3A:
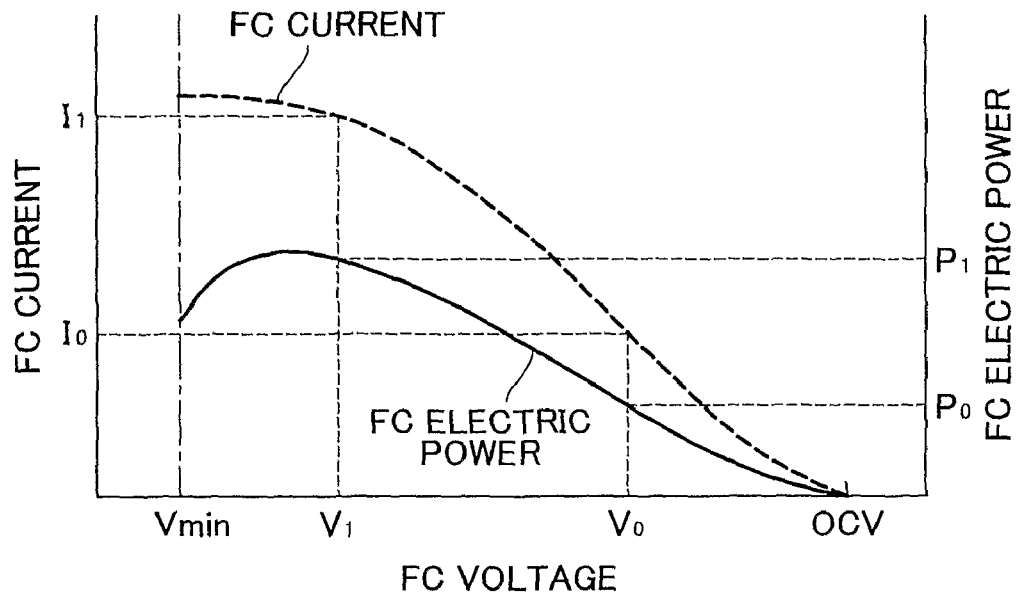
FIGS. 3A and 3B are graphs showing a control of an output of the fuel cell system 200 by adjusting an output voltage of a DC/DC converter 64.
Figure 3B:
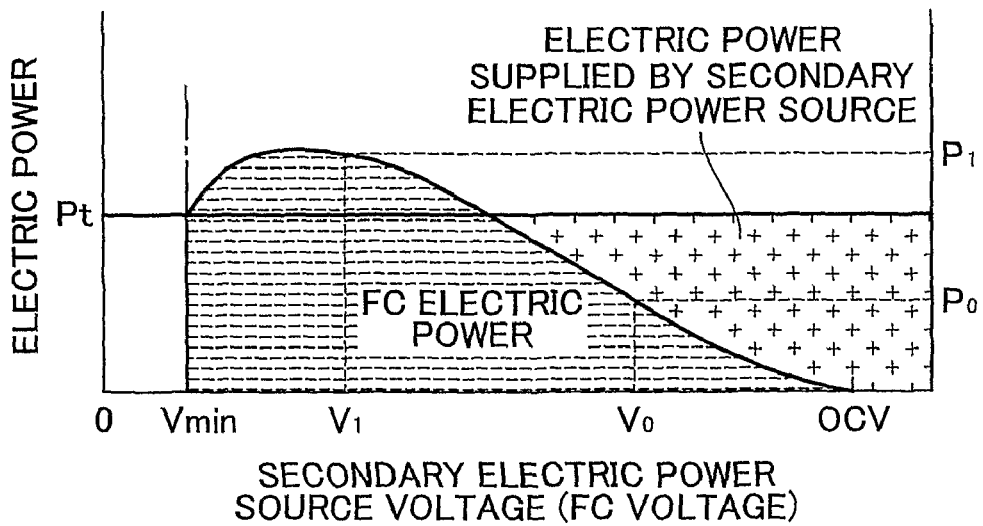

FIGS. 3A and 3B are graphs showing a control of the output of the fuel cell system by adjusting the output voltage of the DC/DC converter 64. FIG. 3A shows a relation between an FC voltage that is the output voltage of the fuel cell system 200 and an FC current that is the output electric current of the fuel cell system 200. As apparent from FIG. 3A, as the FC voltage increases, the FC current decreases. As the FC voltage decreases, the FC current increases.

More specifically, when the FC voltage is $V_0$, the FC current is $I_0$, and the FC electric power amount is $P_0$. When the FC voltage decreases to $V_1$, the FC current increases to $I_1$, and the FC electric power amount increases to $P_1$. However, when the FC voltage decreases to a value lower than $V_1$, the FC current increases by an only slight amount, and the FC electric power amount that is a product of the FC current and the FC voltage starts to decrease.

In order to protect the fuel cell system 200, the electric power source system 20 is configured such that the FC voltage does not become lower than a minimum operating voltage Vmin. As a result, the fuel cell system 200 is operated at an output voltage between an open circuit voltage OCV and the minimum operating voltage Vmin.

FIG. 3B shows electric power supplied by the fuel cell system 200 (refer to FIG. 1) to which the DC/DC converter 64 is connected in parallel. An electric power amount Pt is an amount of required driving electric power at a certain moment (refer to FIGS. 2A and 2B). The FC electric power amount is indicated as a region hatched by symbols "−". An amount of electric power supplied by a secondary electric power source is indicated as a region hatched by symbols "+". The FC electric power amount is the same as that shown in FIG. 3A.

For example, when a secondary electric power source voltage is $V_0$, the value of the FC electric power amount is $P_0$ that is smaller than the required driving electric power amount Pt. Therefore, the DC/DC converter 64 supplies electric power of an amount equivalent to a difference between the required driving electric power amount Pt and the FC electric power amount $P_0$ ($=Pt-P_0$). Meanwhile, when the secondary electric power source voltage decreases to $V_1$, the value of the FC electric power amount increases to $P_1$ that is larger than the required driving electric power amount Pt. Therefore, the excess amount of electric power in the FC electric power amount ($=P_1-Pt$) is supplied to the secondary battery 26 via the DC/DC converter 64 (refer to FIG. 2B). Thus, the electric power source system 20 can control the FC electric power amount by adjusting the secondary electric power source voltage (the output voltage of the DC/DC converter 64).

Thus, the output of the fuel cell system 200 can be adjusted in accordance with the driving electric power amount required by the drive circuit 36 and the charge state of the secondary battery. For example, when the driving electric power amount required by the drive circuit 36 is large, or when the charge amount of the secondary battery 26 is small, the secondary electric power source voltage is controlled to a low value. Meanwhile, when the driving electric power amount required by the drive circuit 36 is small, and the charge amount of the secondary battery is excessively large, the output voltage of the DC/DC converter 64 is controlled to a large value.

For the sake of simplicity of description, in this embodiment, when the fuel cell system 200 is started, a flow rate of reaction gas for the fuel cell system 200 is appropriately controlled in order to suppress flooding and to make a starting time short. Therefore, in this embodiment, the output of the fuel cell system 200 is controlled by controlling only the output voltage of the DC/DC converter 64, and the output of the fuel cell system 200 is not controlled by controlling the flow rate of the reaction gas.

However, when the output of the fuel cell system 200 is controlled by controlling the output voltage of the DC/DC converter 64, the output of the fuel cell system 200 is changed in quick response, as compared to when the output of the fuel cell system 200 is controlled by controlling the flow rate of the reaction gas. Thus, since the output of the fuel cell system 200 is controlled mainly by controlling the output voltage of the DC/DC converter 64 in this embodiment, it is possible to obtain a noticeable effect of improving driveability.

B. Control of the Vehicle According to the Embodiment of the Invention

FIG. 4 is a control block diagram showing a control of the vehicle according to the embodiment of the invention. The control block diagram includes the accelerator sensor 35, the control portion 50, the electric power source system 20, and the drive circuit 36. The accelerator sensor 35 receives an accelerator pedal operation input signal (the accelerator pedal operation amount Wt) from the driver who is a user. The control portion 50 receives the accelerator pedal operation amount Wt from the accelerator sensor 35. The electric power source system 20 and the drive circuit 36 are controlled by the control portion 50 in accordance with the accelerator pedal operation input signal from the driver.

The control portion 50 includes a driving electric power control portion 14, a converter control circuit 16, and a maximum output estimation portion 15. The driving electric power control portion 14 outputs a required electric power command value Pt and a driving voltage command value Vt to the drive circuit 36 and the converter control circuit 16, respectively, in accordance with the accelerator pedal operation amount Wt. The required electric power command value Pt is a command value for causing the motor 31 to generate driving power in accordance with the accelerator pedal operation amount Wt. The driving voltage command value Vt is a command value for controlling the output voltage (driving voltage) of the electric power source system 20 so that the required driving electric power amount corresponding to the required electric power command value Pt can be supplied to the drive circuit 36. The output voltage of the electric power source system 20 is controlled by controlling the output voltage of the DC/DC converter 64, as described above.

Figure 5:
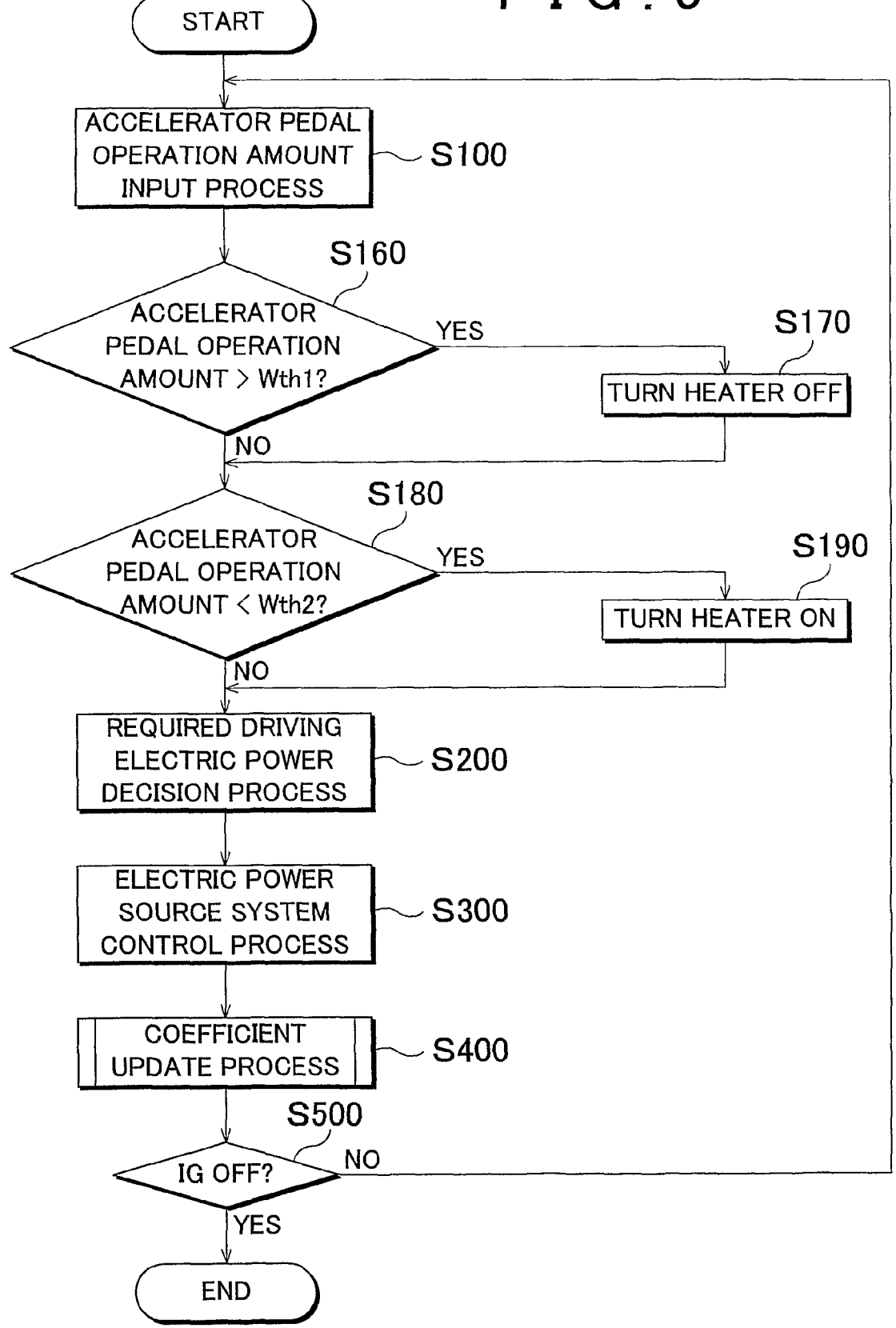
FIG. 5 is a flowchart showing the control of the vehicle according to the embodiment of the invention.

FIG. 5 is a flowchart showing the control of the vehicle according to the embodiment of the invention. In step S100, the control portion 50 obtains the accelerator pedal operation amount Wt from the accelerator sensor 35. The control portion 50 obtains the accelerator pedal operation amount Wt, for example, by receiving a signal indicative of the depression amount of the accelerator pedal detected by the accelerator sensor 35, at a predetermined sampling cycle.

Step S160 is performed so that supply of electric power to the heater 201 is stopped only when the required electric power command value Pt is close to an estimated suppliable driving electric power amount Pmest (that is, a maximum suppliable electric power amount) at a time when electric power is supplied to the heater 201, which will be described later. It is determined whether the required electric power command value Pt is close to the estimated suppliable driving electric power amount Pmest at the time when electric power is supplied to the heater 201, based on whether the accelerator pedal operation amount is larger than a threshold value Wth1. When an affirmative determination is made in step S160 ("YES" in step S160), the control portion 50 (refer to FIG. 1) stops supply of electric power to the heater 201 which is provided in the fuel cell system 200 in step S170. The purpose of stopping the supply of electric power to the heater 201 is to increase the maximum suppliable electric power amount of the electric power source system 20.

Step S180 is performed so that the supply of electric power to the heater 201 is restarted only when the required electric power command value Pt is sufficiently smaller than the estimated suppliable driving electric power amount Pmest at the time when electric power is supplied to the heater 201, and the required electric power command value Pt is unlikely to become close to the estimated suppliable driving electric power amount Pmest again. It is determined whether the required electric power command value Pt is sufficiently smaller than the estimated suppliable driving electric power amount Pmest at the time when electric power is supplied to the heater 201, and the required electric power command value Pt is unlikely to become close to the estimated suppliable driving electric power amount Pmest again, based on whether the accelerator pedal operation amount is smaller than a threshold value Wth2 that is smaller than the threshold value Wth1. When an affirmative determination is made in step S180 ("YES" in step S180), the control portion 50 restarts the supply of electric power to the heater 201 provided in the fuel cell system 200 in step S190.

Thus, the threshold value Wth2 for turning the heater 201 on is made smaller than the threshold value Wth1 for turning the heater 201 off, in order to suppress deterioration of the heater 201 caused by turning the heater 201 on and off frequently.

In step S200, the control portion 50 decides the required electric power command value Pt in accordance with the accelerator pedal operation amount Wt, and outputs the required electric power command value Pt to the drive circuit 36. In this embodiment, the required electric power command value Pt is decided by multiplying the accelerator pedal operation amount Wt by a positive coefficient α. The accelerator pedal operation amount Wt is multiplied by the positive coefficient α so that when the depression amount of the accelerator pedal operated by the driver is increased, power for driving the vehicle is increased. As the positive coefficient α, a predetermined initial value is used in the first routine. However, in the next routine and subsequent routines, a positive coefficient α that is updated in step S400 is used, as described later.

Figure 6A:
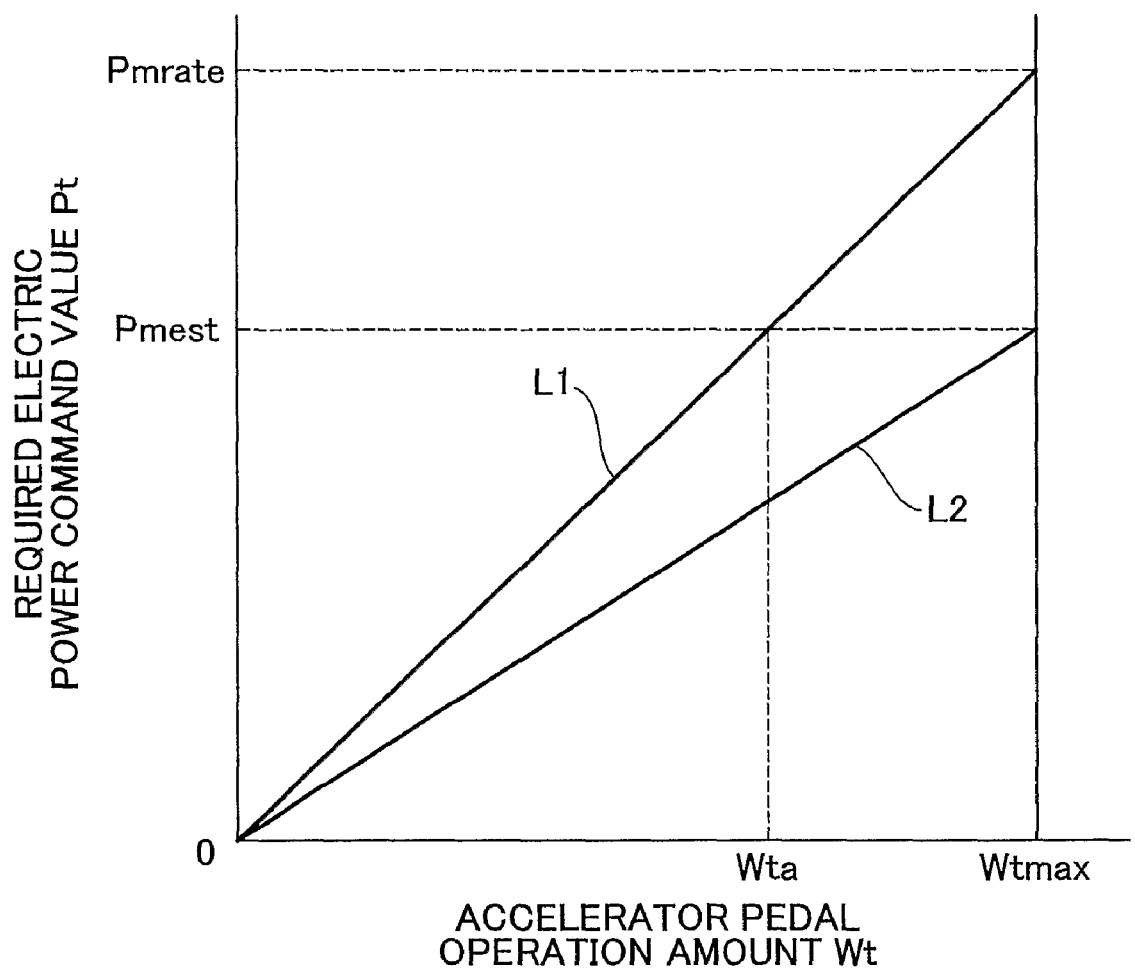
FIGS. 6A and 6B are graphs showing an example of a relation between an accelerator pedal operation amount Wt, and a required electric power command value Pt and a suppliable driving electric power amount Ps.
Figure 6B:
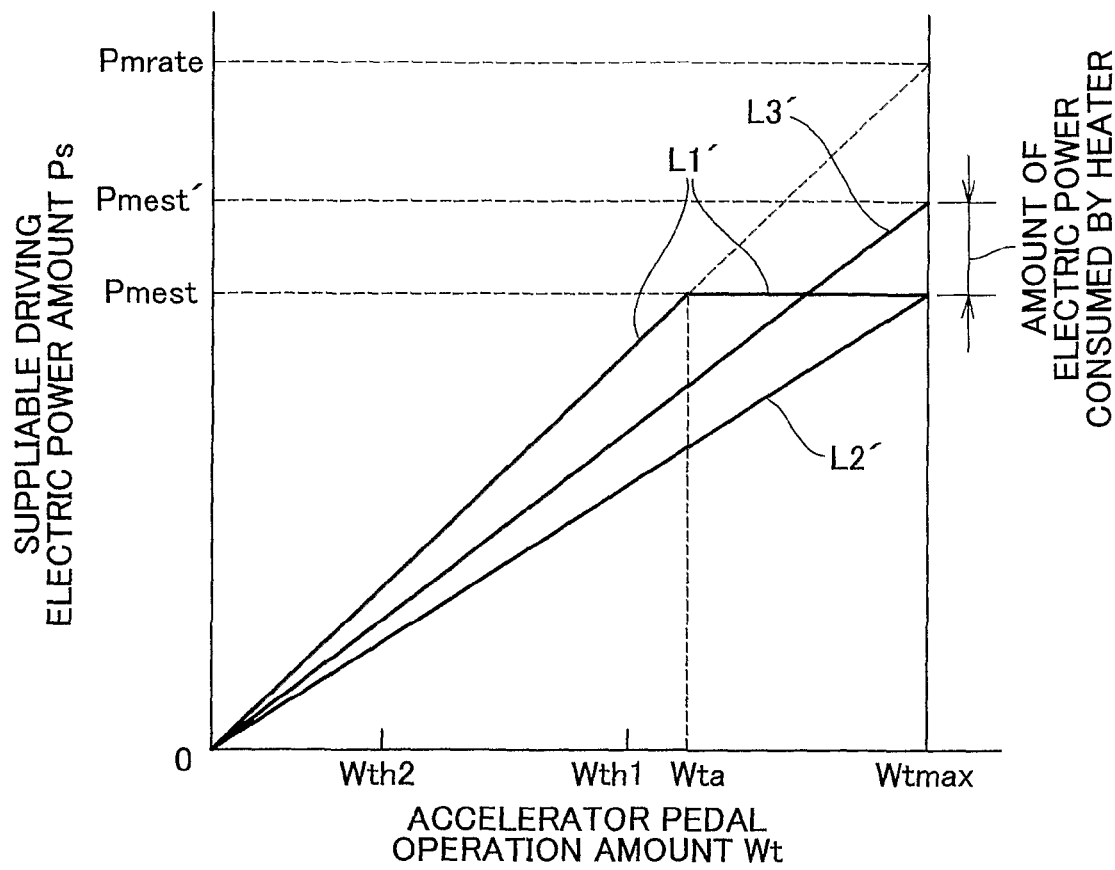

FIG. 6A shows a relation between the accelerator pedal operation amount Wt and the required electric power command value Pt. FIG. 6B shows a relation between the accelerator pedal operation amount Wt and the suppliable driving electric power amount Ps which is the amount of driving electric power that can be supplied. In FIGS. 6A and 6B, each of a line L1 and a line L1' indicates a relation in a case where the invention is not applied. Each of a line L2, a line L2', and a line L3 indicates a relation in the embodiment of the invention.

In the case where the invention is not applied, there is the following relation between the accelerator pedal operation amount Wt, and the required electric power command value Pt and the suppliable driving electric power amount Ps. As indicated by the line L1, there is a linear relation between the accelerator pedal operation amount Wt and the required electric power command value Pt, in which a maximum accelerator pedal operation amount Wtmax corresponds to a maximum rated output value Pmrate of the electric power source system 20. The relation is selected so that the driver can use the maximum rated output Pmrate, and the vehicle can be driven linearly in accordance with the accelerator pedal operation amount Wt in a case where the electric power source system 20 can generate the maximum rated output Pmrate.

However, in a case where the electric power source system 20 cannot generate the maximum rated output Pmrate, for example, when the electric power system 20 is started, the suppliable driving electric power amount Ps, which is the amount of electric power that can be supplied to the drive circuit 36 by the electric power source system 20, reaches the maximum value at an accelerator pedal operation amount Wta. Then, the output of the electric power source system 20 is constant during a period from the accelerator pedal operation amount Wta to the maximum accelerator pedal operation amount Wtmax, as indicated by the line L1'. As a result, when the driver depresses the accelerator pedal 37, the vehicle 100 is not accelerated despite the intention of the driver. Thus, the driveability is decreased.

In this embodiment, the decrease in the driveability is suppressed by changing the relation between the accelerator pedal operation amount Wt and the required driving electric power command value Pt from the line L1 to the line L2 by a process in step S400 described later. The line L2 indicates a linear relation between the accelerator pedal operation amount Wt and the required electric power command value Pt, in which the maximum accelerator pedal operation amount Wt corresponds to the estimated suppliable driving electric power amount Pmest.

Thus, the relation between the accelerator pedal operation amount Wt and the suppliable driving electric power amount Ps can be changed from the line L1' to the line L2', as shown in FIG. 6B.

Thus, in this embodiment, the driver can use the driving electric power that can be actually output by the electric power source system 20. In addition, the driving power is increased with an increase in the accelerator pedal operation amount Wt over an entire range of the accelerator pedal operation amount Wt. Thus, when the driver depresses the accelerator pedal 37, the vehicle 100 is constantly accelerated as intended by the driver. Accordingly, the driveability can be improved.

Further, in this embodiment, since step S170 is performed, when the required electric power command value Pt exceeds the estimated suppliable driving electric power amount Pmest, the supply of electric power to the heater 201 is stopped and the maximum suppliable driving electric power of the electric power source system 20 is increased, as indicated by the line L3' in FIG. 6B. Therefore, even when the maximum output of the fuel cell system 200 is changed, a region in which the output for driving the vehicle is increased with an increase in the depression amount of the accelerator pedal is increased. As a result, the driveability is improved.

In step S300, the control portion 50 controls the electric power source system 20 so that the electric power source system 20 can supply the driving electric power required by the drive circuit 36. The electric power source system 20 is controlled by controlling the output voltage of the DC/DC converter 64 which is connected to the fuel cell system 200 in parallel, as described above. The output voltage of the DC/DC converter 64 is controlled by the converter control circuit 16. The converter control circuit 16 is controlled in accordance with the voltage command value input thereto from the driving electric power control portion 14.

In step S400, the control portion 50 performs a coefficient update process. The coefficient update process is a process of updating the positive coefficient α, which is a proportionality constant for obtaining the required electric power command value Pt based on the accelerator pedal operation amount Wt, in accordance with a state of the fuel cell system 200.

Figure 7:
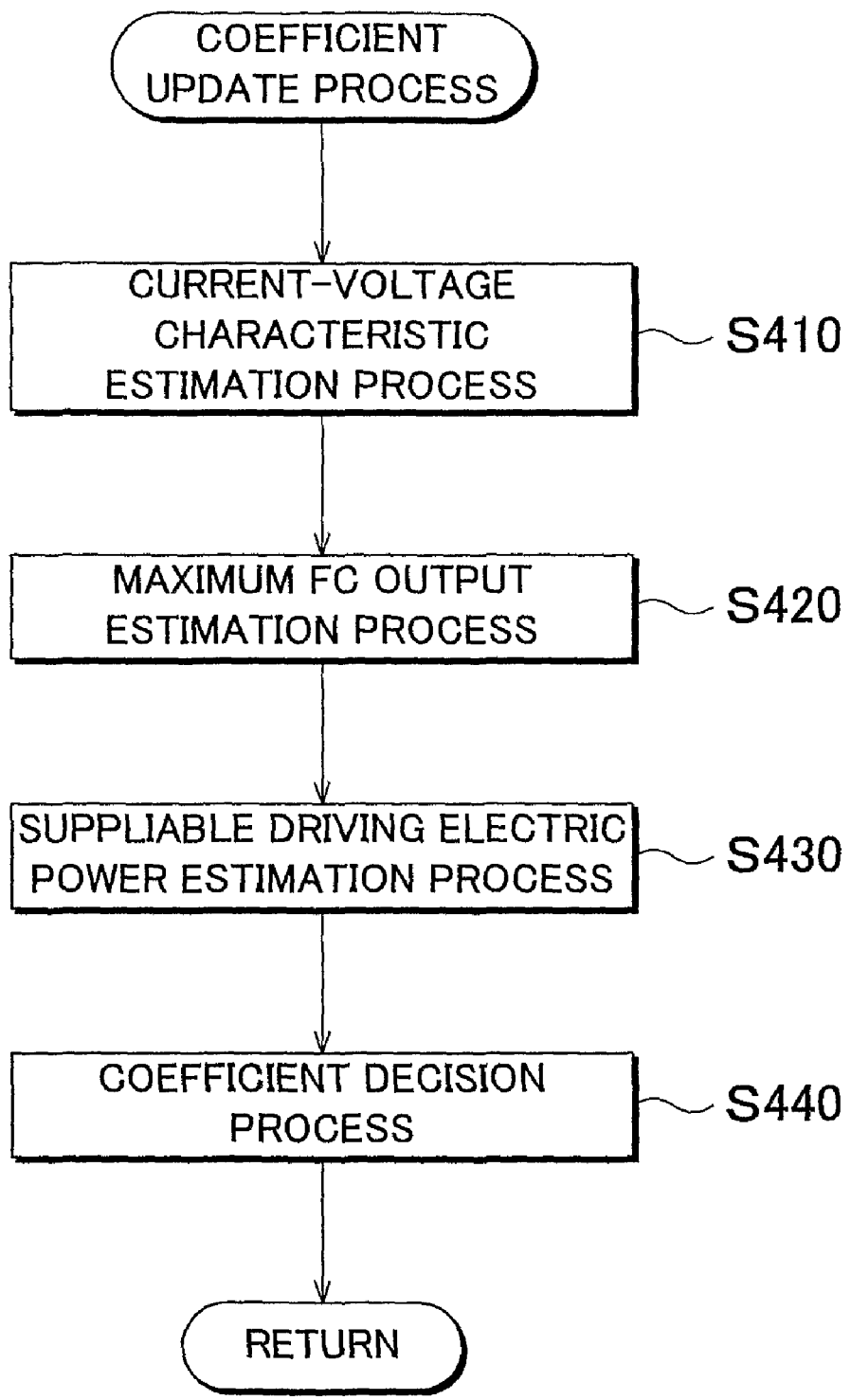
FIG. 7 is a flowchart showing a coefficient update process in the embodiment of the invention.

FIG. 7 is a flowchart showing the coefficient update process in the embodiment of the invention. In step S410, the maximum output estimation portion 15 estimates a current-voltage characteristic. The current-voltage characteristic is estimated based on the maximum output estimation map 15M (FIG. 4) in accordance with the FC current and the FC voltage. The FC current and the FC voltage are measured using the ammeter 67 and the voltmeter 69, respectively (refer to FIG. 1 and FIG. 4). In this embodiment, the maximum output estimation map 15M is provided in the maximum output estimation portion 15.

Figure 8A:
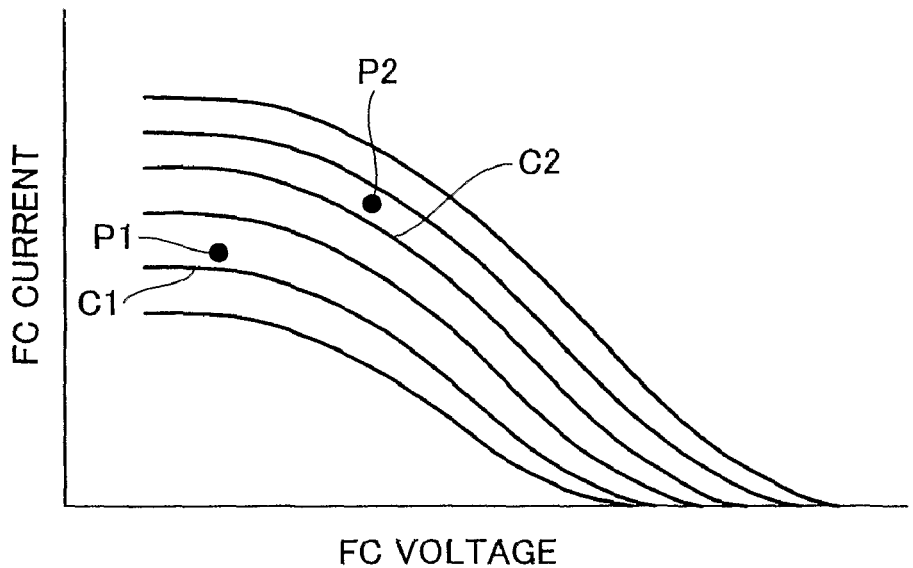
FIGS. 8A and 8B are graphs showing a method of estimating a maximum FC electric power amount using a maximum output estimation map 15M.
Figure 8B:
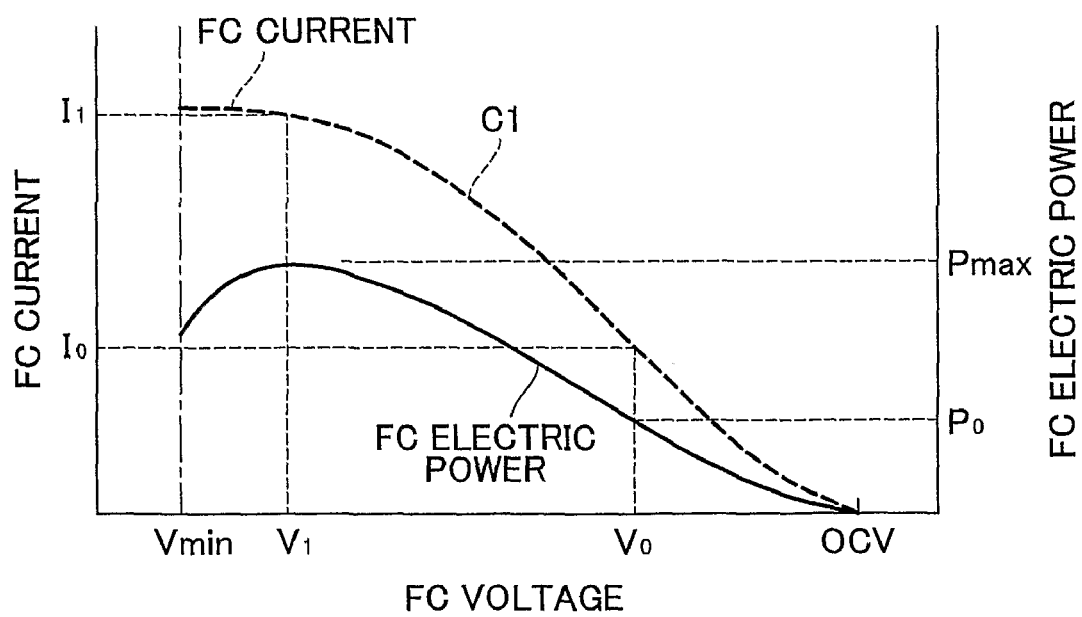

FIGS. 8A and 8B are graphs showing a method of estimating the maximum FC electric power amount using the maximum output estimation map 15M. FIG. 8A shows a method of estimating the current-voltage characteristic in accordance with the FC current and the FC voltage. FIG. 8B shows a method of estimating the maximum FC electric power amount based on the estimated current-voltage characteristic. The maximum output estimation map 15M has plural curved lines including curved lines C1 and C2 each of which indicates the current-voltage characteristic at a uniform temperature of the fuel cell (not shown) provided in the fuel cell system 200.

For example, in a case where a point indicated by the measured FC current and the measured FC voltage is a point P1, the curved line C1 is selected as the curved line indicating the current-voltage characteristic. For example, in a case where a point indicated by the measured FC current and the measured FC voltage is a point P2, the curved line C2 is selected as the curved line indicating the current-voltage characteristic.

In step S420, the control portion 50 performs a maximum FC output estimation process. The maximum FC output estimation process is a process of estimating the maximum output of the fuel cell system 200, which is obtained by adjusting the FC voltage. In this embodiment, the maximum FC output is the maximum value of the FC electric power amount as shown in FIG. 8B, and the maximum FC output is set to a unique value in each curved line indicating the current-voltage characteristic. For example, in a case where the curved line C2 is selected, the maximum FC output is estimated to be a value Pmax.

In step S430, the control portion 50 performs a suppliable driving electric power estimation process. The suppliable driving electric power estimation process is a process of estimating the maximum amount of electric power that can be supplied by the electric power source system 20. In this embodiment, the maximum amount of electric power that can be supplied by the electric power source system 20 is obtained by subtracting an electric power amount consumed by auxiliary machines of the fuel cell system 200 including the heater 201 from a sum of the maximum FC output and the maximum output of the DC/DC converter 64.

In step S440, the control portion 50 performs a coefficient decision process. In the coefficient decision process, the positive coefficient α is calculated by dividing the estimated suppliable driving electric power amount Pmest by the maximum accelerator pedal operation amount Wtmax. The control portion 50 updates the positive coefficient α to the value that is calculated in this manner. Thus, the process in step S400 is completed (refer to FIG. 5).

These processes (step S100 to step S400) are repeated at a predetermined cycle until the ignition switch is turned off (step S500). Thus, even when the maximum output of the fuel cell system 200 is changed, the electric power amount supplied by the electric power source system 20 is proportional to the accelerator pedal operation amount Wt over an entire range of the accelerator pedal operation amount Wt.

Thus, in the vehicle according to the embodiment, even when the maximum output of the fuel cell system 200 is changed, the control is performed such that the output for driving the vehicle is constantly increased with an increase in the accelerator pedal operation amount Wt over an entire range of the accelerator pedal operation amount Wt. Therefore, the driveability is improved.

Figure 9:
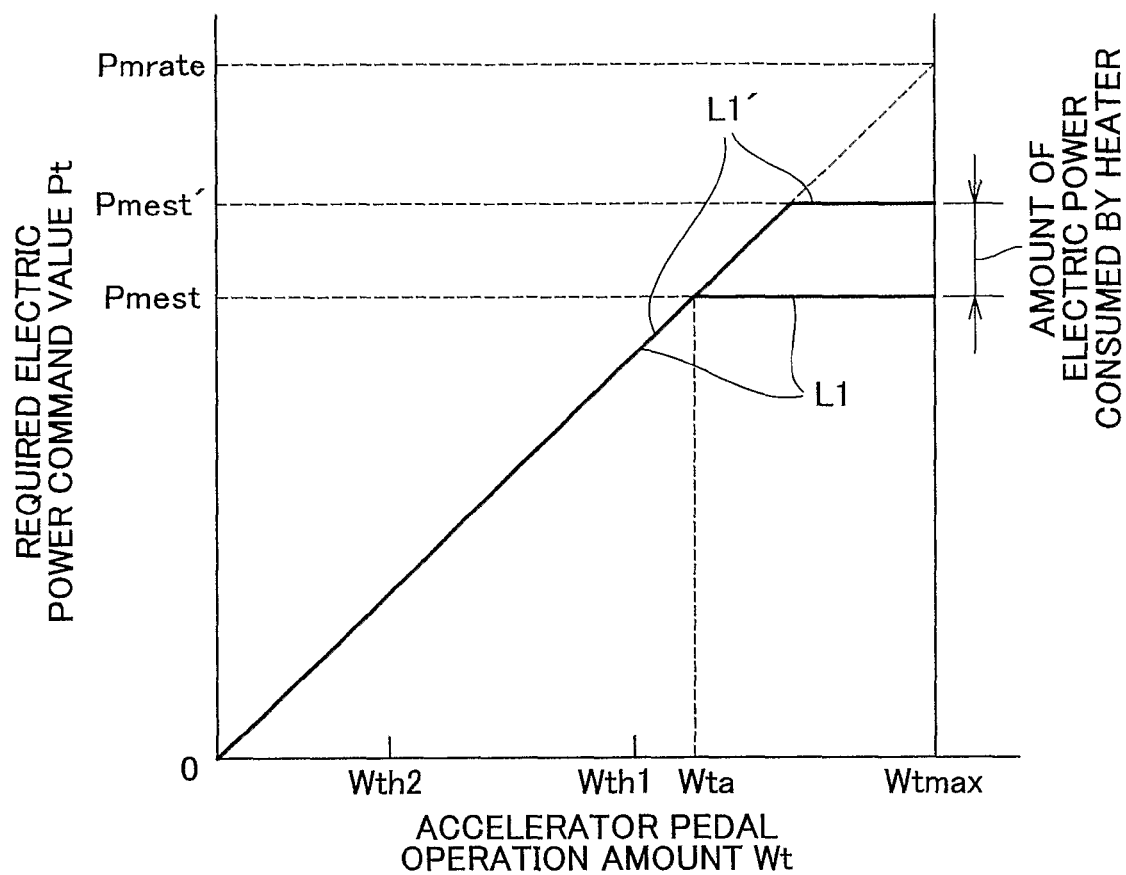
FIG. 9 is a graph explaining that a region in which the required electric power amount is increased with an increase in the accelerator pedal operation amount is increased by turning a heater off.

The aforementioned embodiment can be modified as follows. For example, step S400 in FIG. 5 may be omitted. In this case, in step S200, the required electric power command value Pt is decided by multiplying the accelerator pedal operation amount Wt by the positive coefficient α. Since step S400 is not performed, a predetermined positive coefficient α that has not been updated is used in the next and subsequent routines. In this modified example, as shown in FIG. 9, when the required electric power command value Pt exceeds the estimated suppliable driving electric power amount Pmest, the supply of electric power to the heater 201 is stopped, and the maximum suppliable driving electric power amount of the electric power source system 20 is increased. Therefore, even when the maximum output of the fuel cell system 200 is changed, a region in which the output for driving the vehicle is controlled to be increased with an increase in the depression amount of the accelerator pedal is increased. As a result, the driveability is improved.

In order to increase the maximum suppliable driving electric power amount of the electric power source system 20, the supply of electric power to the heater 201 does not necessarily need to be stopped. The amount of electric power supplied to the heater 201 may be reduced. For example, in a case where the heater 201 includes plural heater elements that are connected to the secondary battery 26 via a switch (not shown), supply of electric power to all of plural heating wires does not need to be stopped. Also, a state of connection between the heating wires may be changed so as to reduce the amount of electric power supplied to the heater 201.

Figure 10A:
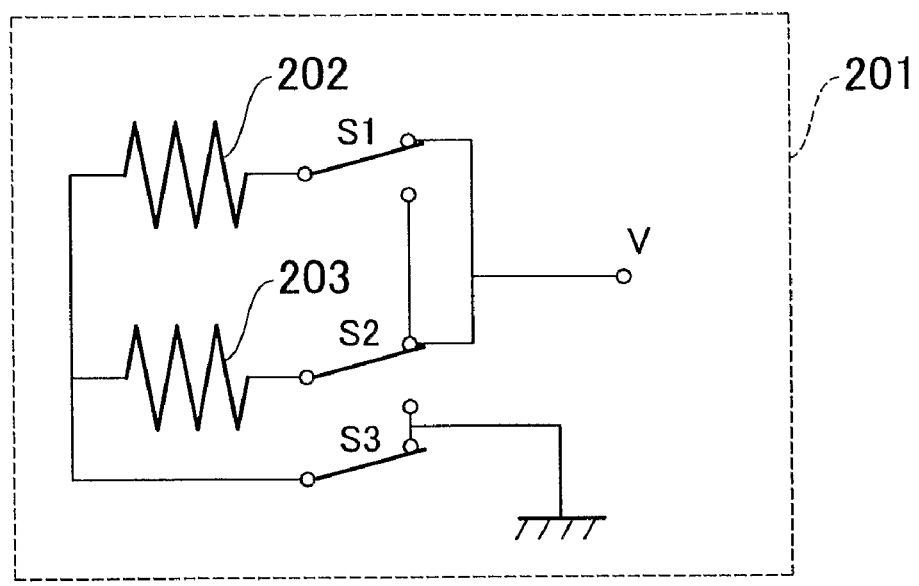
FIGS. 10A to 10C are explanatory diagrams explaining that an amount of electric power supplied to the heater is reduced by changing a state of connection between plural heater elements.
Figure 10B:
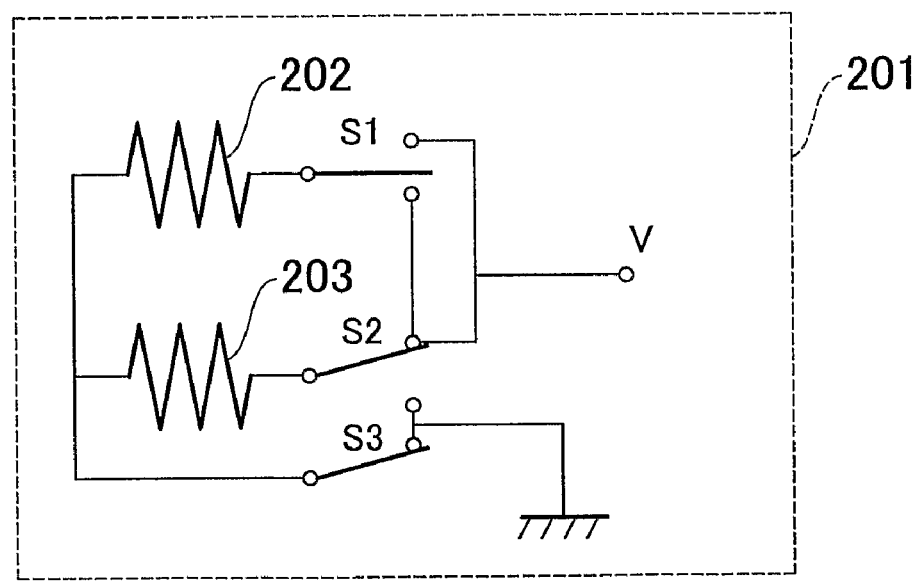
Figure 10C:
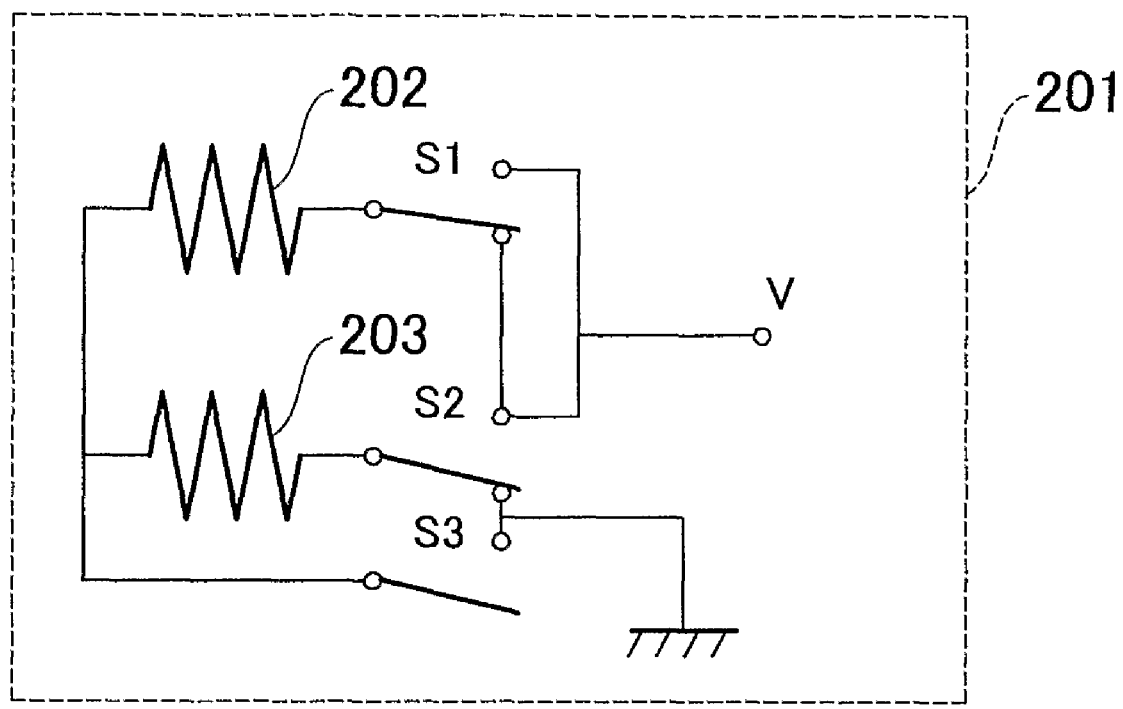

FIGS. 10A to 10C are explanatory diagrams explaining that an amount of electric power supplied to the heater 201 is reduced by changing a state of connection between the plural heater elements. The heater 201 includes two heater elements 202 and 203, and two switches S1 and S2, and a switch S3. The two heater elements 202 and 203 have the same resistance value. The switch S1 is connected to one end of the heater element 202. The switch S2 is connected to one end of the heater element 203. The switch S3 is connected to the other end of the heater element 202 and the other end of the heater element 203. The heater 201 is directly connected to the secondary battery 26.

The amount of electric power supplied to the heater 201 can be changed by changing the state of connection between the three switches S1, S2, and S3. For example, in a case where the three switches S1, S2, and S3 are in the state shown in FIG. 10A, electric power is consumed by both of the two heater elements 202 and 203. In a case where the three switches S1, S2, and S3 are in the state shown in FIG. 10B, the switch S1 is turned off, and the amount of electric power consumed by the heater element 202 is reduced. In a case where the three switches S1, S2, and S3 are in the state shown in FIG. 10C, the two heater elements 202 and 203 are connected to each other in series. Therefore, an electric current value is reduced by half, and the amount of consumed electric power is reduced by half, as compared to the case shown in FIG. 10B. Since the heater generates heat using the resistance, the amount of consumed electric power is charged according to the state of connection as described above.

The number of the heater elements is two or more, and is not limited to two. Also, the state of connection between all the plural heater elements is not necessarily changeable. Only the state of connection between at least two of the plural heater elements may be changeable. Further, the operation of turning a switch on and off may be combined with the operation of changing the connection between the plural heater elements from a parallel connection to a series connection.

In general, an inductance component of the heater is small. Therefore, the aforementioned operation of changing the connection between the heater elements can increase the maximum suppliable driving electric power amount, with little time delay. Thus, the aforementioned operation of changing the connection between the heater elements greatly contributes to improvement of operability of the electric power source. Examples of the heater include a sheath heater, a glove plug heater, and a PTC heater.

In order to increase the maximum suppliable driving electric power amount of electric power source system 20, the amount of electric power supplied to the heater 201 or other auxiliary machines of the electric power source system 20 does not necessarily need to be reduced. For example, an amount of electric power supplied to a heater for removing fog of a rear window (not shown) may be reduced. However, in a case where an amount of electric power supplied to plural systems is reduced, it is preferable to reduce the amount of electric power supplied to each system according to a priority given to each system.

The heater 201 may include only one heater element. In this case, the amount of electric power supplied to the one heater element is reduced.

Also, as a difference between the estimated suppliable driving electric power amount and the required electric power amount is increased, the amount of electric power supplied to the heater may be decreased.

E. Modified Example

Although the embodiment of the invention has been described, the invention is not limited to the embodiment. Various modifications may be made without departing from the spirit of the invention. For example, the invention can be realized in the following modified examples.

E-1 In the aforementioned embodiment, there is the linear relation between the accelerator pedal operation amount and the required driving electric power amount. However, the relation between the accelerator pedal operation amount and the required driving electric power amount may be non-linear.

E-2 In the aforementioned embodiment, the electric power source system includes the secondary battery. However, the electric power source system that is used in the invention may not include the secondary batter, as long as the electric power source system includes a fuel cell.

E-3 In the aforementioned embodiment, it is assumed that the invention is applied to the case where the output is decreased when the fuel cell system is started. However, for example, the invention can be applied to the case where the output of the fuel cell system is decreased due to aged deterioration of the fuel cell system or due to the charge state or aged deterioration of the secondary battery. It is possible to estimate the decrease in the output due to the charge state or the aged deterioration of the secondary battery, for example, based on a current-voltage characteristic or the charge amount of the secondary battery. The charge amount can be measured by the remaining capacity monitor 28 (refer to FIG. 1). Further, for example, during a starting sequence of the fuel cell system, a simple estimation method may be employed, in which the output is constantly estimated to be 50% of a rated output.

E-4 In the aforementioned embodiment, the decrease in the output at a time when the fuel cell system is started is estimated based on the current-voltage characteristic of the fuel cell system. However, a temperature of the fuel cell (not shown) may be measured by a thermometer shown in FIG. 1, and the decrease in the output of the fuel cell system may be estimated based on the measured temperature of the fuel cell. The temperature of the fuel cell can be measured, for example, based on a temperature of coolant in the fuel cell.

E-5 In the aforementioned embodiment, the output of the fuel cell system is controlled by controlling the output voltage of the DC/DC converter. However, the output of the fuel cell system may be controlled by controlling the flow rate of reaction gas for the fuel cell system. Also, the control of the output voltage of the fuel cell system and the control of the flow rate of reaction gas for the fuel cell system may be combined. However, the output of the fuel cell is increased in quick response in the configuration in which the output voltage of the fuel cell system is controlled by controlling the output voltage of the DC/DC converter. Therefore, when this configuration is employed, it is possible to obtain the noticeable effect of improving the driveability.

The invention claimed is:

1. An electric power source control apparatus which controls an electric power source including a fuel cell, the electric power source including a heating portion, the electric power source control apparatus comprising:
   a controller that is configured to:
       receive an operation input signal from an outside of the electric power source, and decide a required output amount of electric power to be output by the electric power source, in accordance with the operation input signal;
       operate the electric power source in accordance with the decided required output amount of electric power;
       estimate a maximum amount of the electric power that is suppliable by the electric power source at a given time; and
       during a time in which at least some of the electric power is to be used for the heating portion, reduce an amount of the electric power used for the heating portion only when the decided required output amount of the electric power is larger than the estimated maximum amount of the electric power that is suppliable by the electric power source, and the operation input signal is a signal for operating a drive circuit for driving a motor that is driven by the electric power source.

2. The electric power source control apparatus according to claim 1, wherein the controller is configured to increase an extent to which the amount of the electric power used for heating is reduced, as a difference between the amount of the electric power that is suppliable by the electric power source and the amount of the required electric power increases.

3. The electric power source control apparatus according to claim 2, wherein the heating portion heats a fuel cell system including the fuel cell by using electric power generated by the electric power source.

4. The electric power source control apparatus according to claim 3, wherein the heating portion heats the fuel cell.

5. The electric power source control apparatus according to claim 4, wherein the heating portion heats the fuel cell by using plural heaters; and the controller adjusts the extent to which the amount of the electric power used for heating is reduced, by changing the number of heaters to which electric power is supplied, among the plural heaters.

6. The electric power source control apparatus according to claim 4, wherein the heating portion heats the fuel cell by using plural heaters; a connection between at least two of the plural heaters is changed between a parallel connection and a series connection; and the controller adjusts the extent to which the amount of the electric power used for heating is reduced, by changing the number of heaters to which electric power is supplied through the series connection.

7. The electric power source control apparatus according to claim 1, wherein the heating portion heats a fuel cell system including the fuel cell by using electric power generated by the electric power source.

8. The electric power source control apparatus according to claim 7, wherein the heating portion heats the fuel cell.

9. The electric power source control apparatus according to claim 8, wherein the heating portion heats the fuel cell by using plural heaters; and the controller adjusts an extent to which the amount of the electric power used for heating is reduced, by changing the number of heaters to which electric power is supplied, among the plural heaters.

10. The electric power source control apparatus according to claim 8, wherein the heating portion heats the fuel cell by using plural heaters; a connection between at least two of the plural heaters is changed between a parallel connection and a series connection; and the controller adjusts an extent to which the amount of the electric power used for heating is reduced, by changing the number of heaters to which electric power is supplied through the series connection.

11. The electric power source control apparatus according to claim 1, wherein the controller limits the control of the electric power source control apparatus at the starting time of the fuel cell.

12. The electric power source control apparatus according to claim 1, wherein the electric power source includes a secondary battery; and the controller estimates the maximum amount of the electric power that is suppliable by the electric power source, based on an operating state of the fuel cell and a charge amount of the secondary battery.

13. The electric power source control apparatus according to claim 1, wherein the controller measures a current-voltage characteristic of the fuel cell, and estimates the maximum amount of the electric power that is suppliable by the electric power source, based on the measured current-voltage characteristic.

14. The electric power source control apparatus according to claim 1, wherein the controller measures a temperature of the fuel cell, and estimates the maximum amount of the electric power that is suppliable by the electric power source, based on the measured temperature.

15. The electric power source control apparatus according to claim 1, wherein the controller supplies the drive circuit with the electric power that is output from the electric power source.

16. A vehicle comprising:
the electric power source control apparatus according to claims 1; and
a vehicle drive portion that drives the vehicle by using electric power supplied by the electric power source.

17. A method of controlling an electric power source including a fuel cell, the electric power source including a heating portion that heats a fuel cell system including the fuel cell by using electric power generated by the electric power source, the method comprising:
receiving an operation input signal from an outside of the electric power source, and deciding a required output amount of electric power to be output by the electric power source, in accordance with the operation input signal;
operating the electric power source in accordance with the decided required output amount of electric power;
estimating a maximum amount of the electric power that is suppliable by the electric power source at a given time; and
during a time in which at least some of the electric power is to be used for the heating portion, reducing an amount of the electric power used for the heating portion only when the detected required output amount of the electric power is larger than the estimated maximum amount of the electric power that is suppliable by the electric power source; and
the operation input signal is a signal for operating a drive circuit for driving a motor that is driven by the electric power source.

18. The method according to claim 17, wherein the heating portion heats a fuel cell system including the fuel cell by using electric power generated by the electric power source.

19. The method according to claim 18, wherein the heating portion heats the fuel cell.

* * * * *